Nov. 29, 1966                A. STANYA ETAL                3,287,963
                SONIC WAVE PULSE ECHO APPARATUS AND METHOD
                       FOR MEASURING FLAW DIMENSION
Filed April 8, 1963                                    6 Sheets-Sheet 5
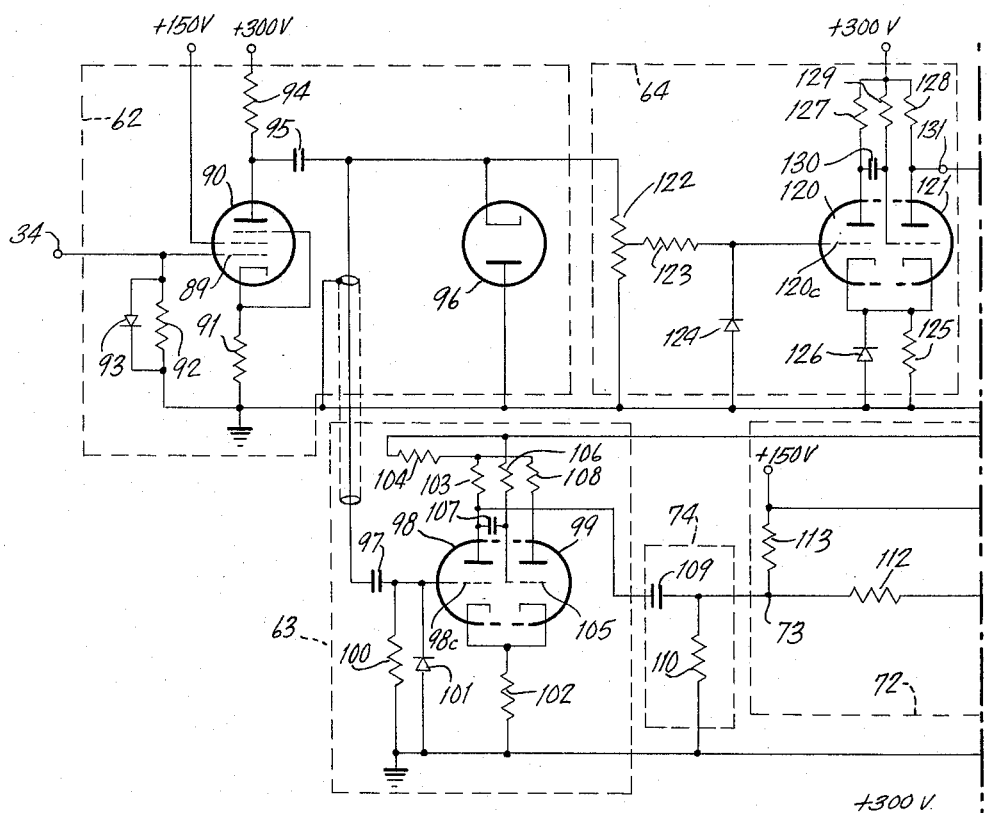
Fig. 5A.
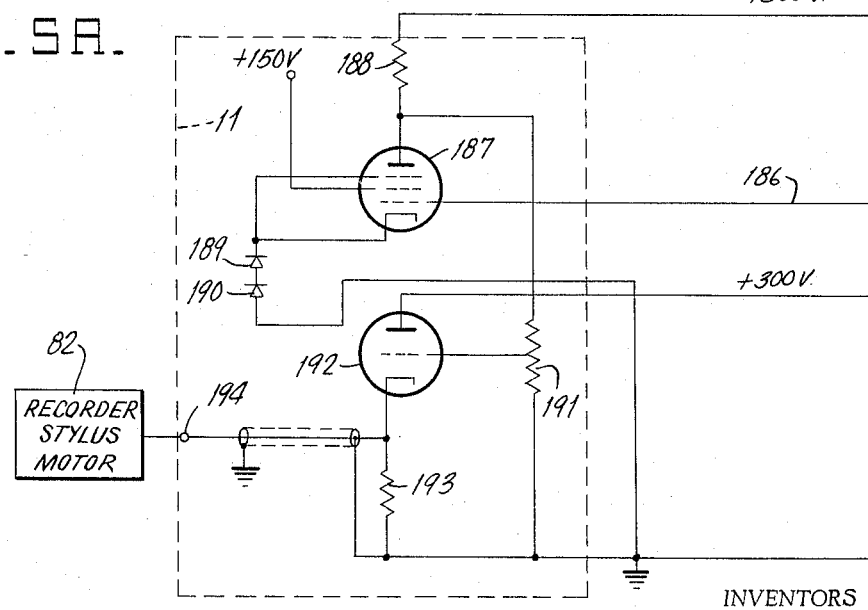
INVENTORS
ANDREW STANYA
NORMAN A. HERRICK
BY
H. H. Hradlief
ATTORNEY

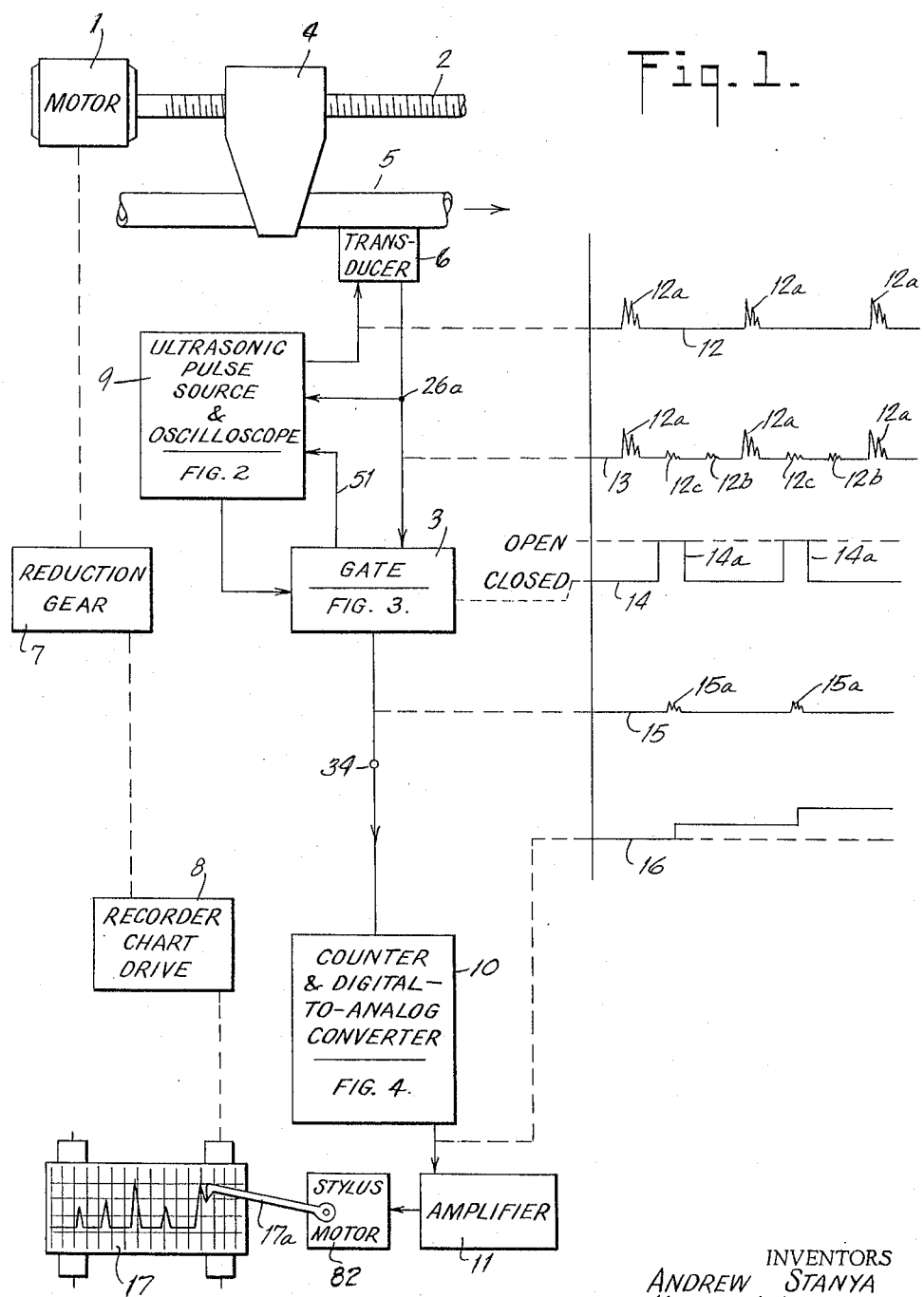

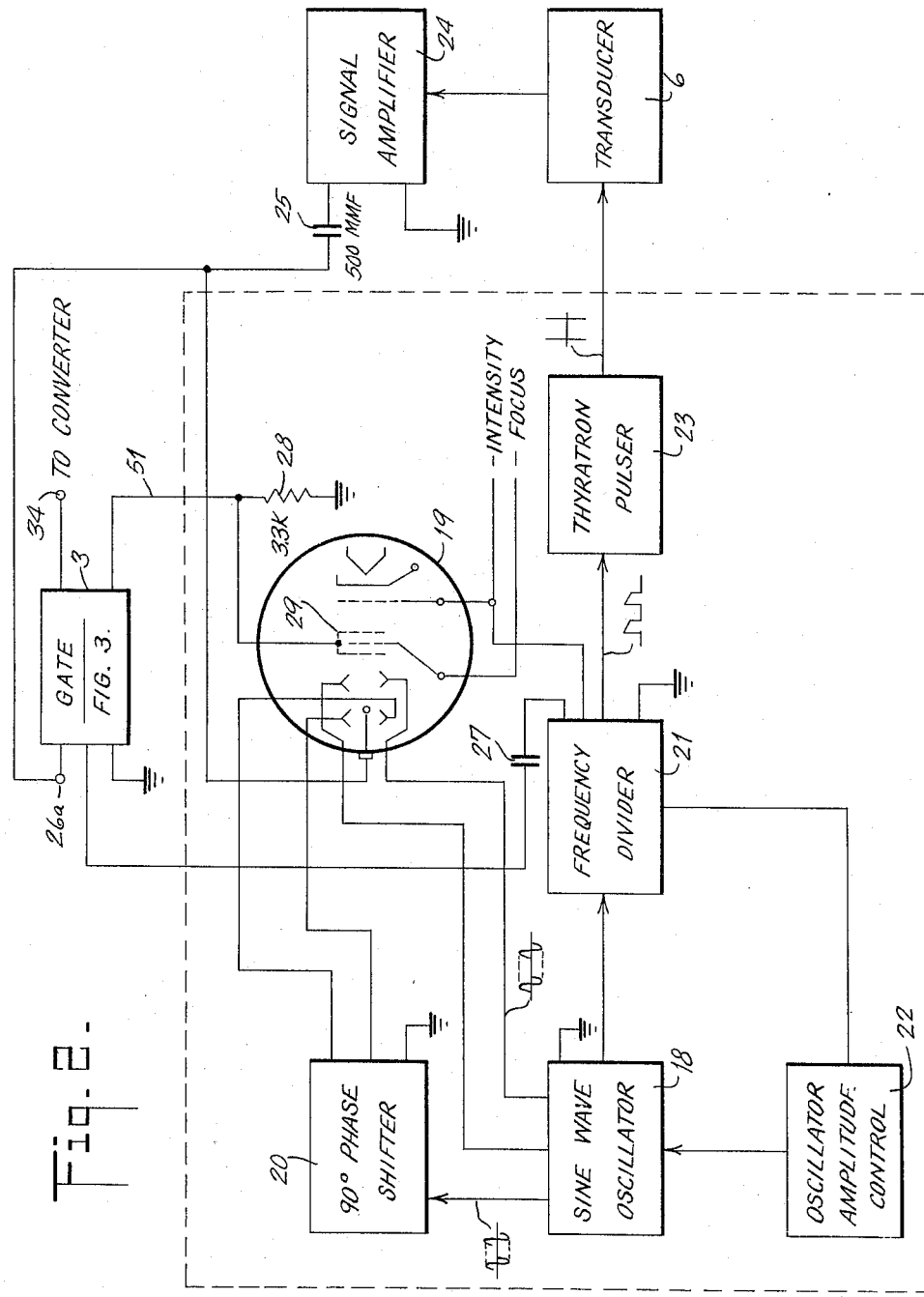

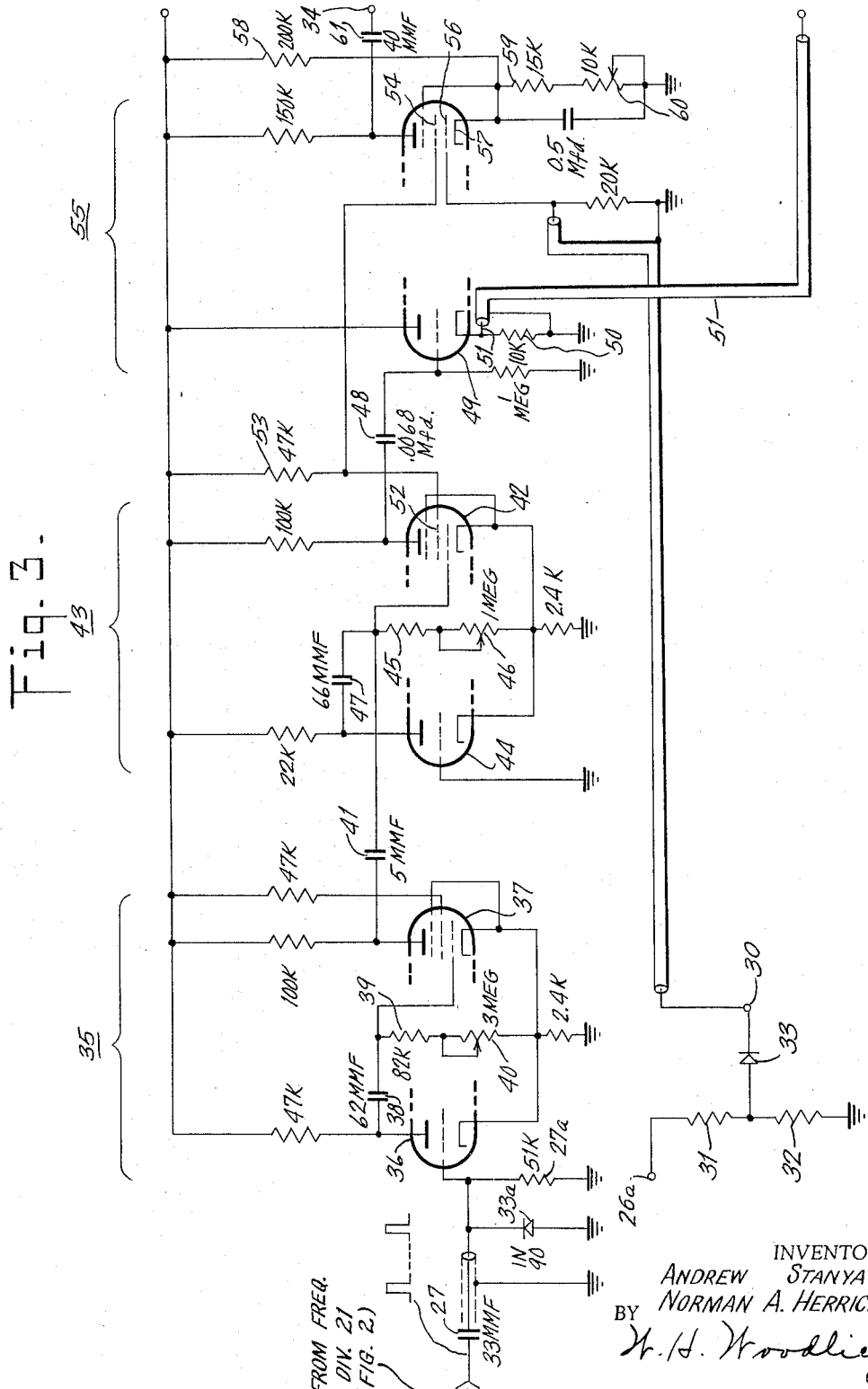

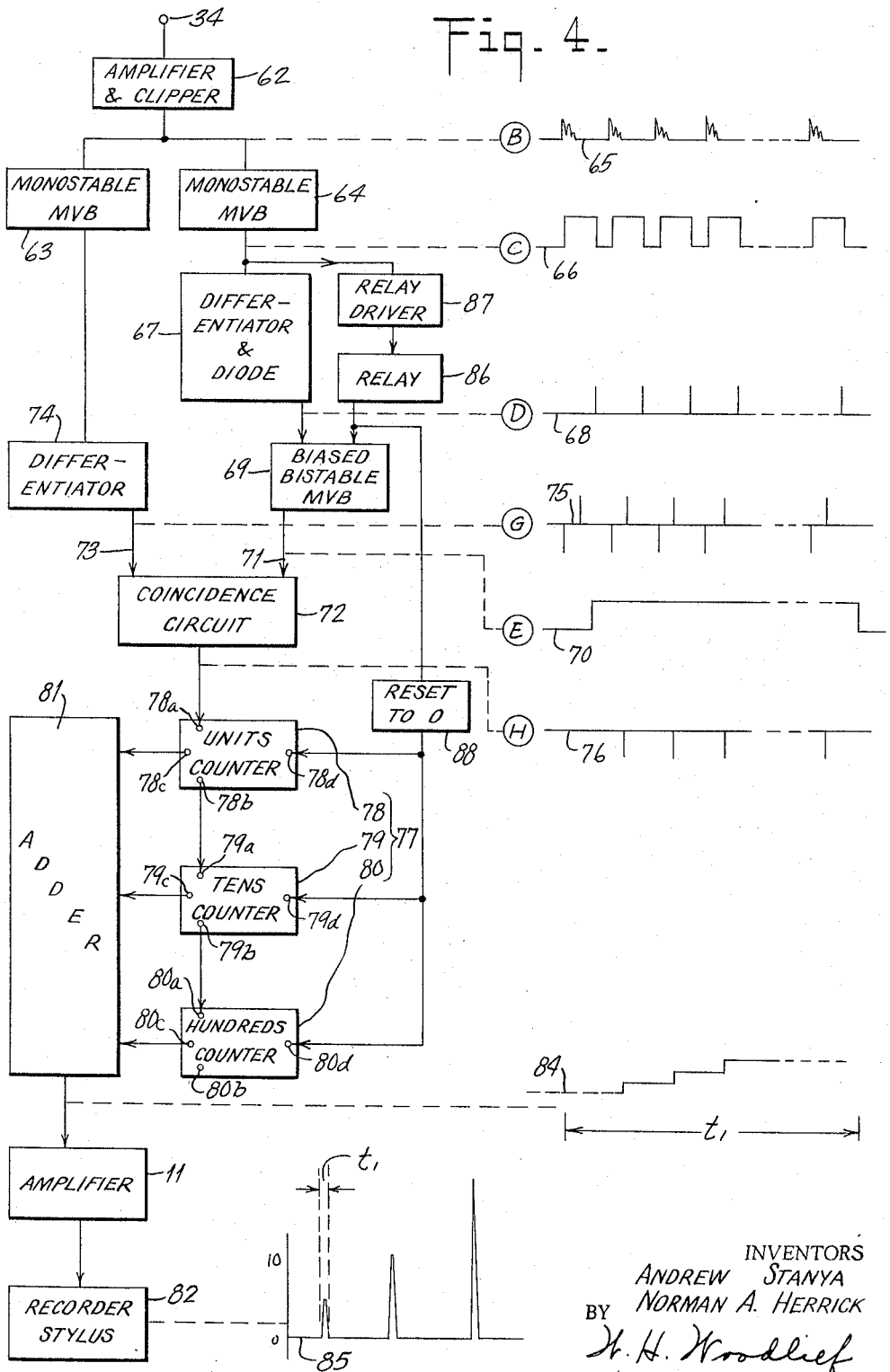

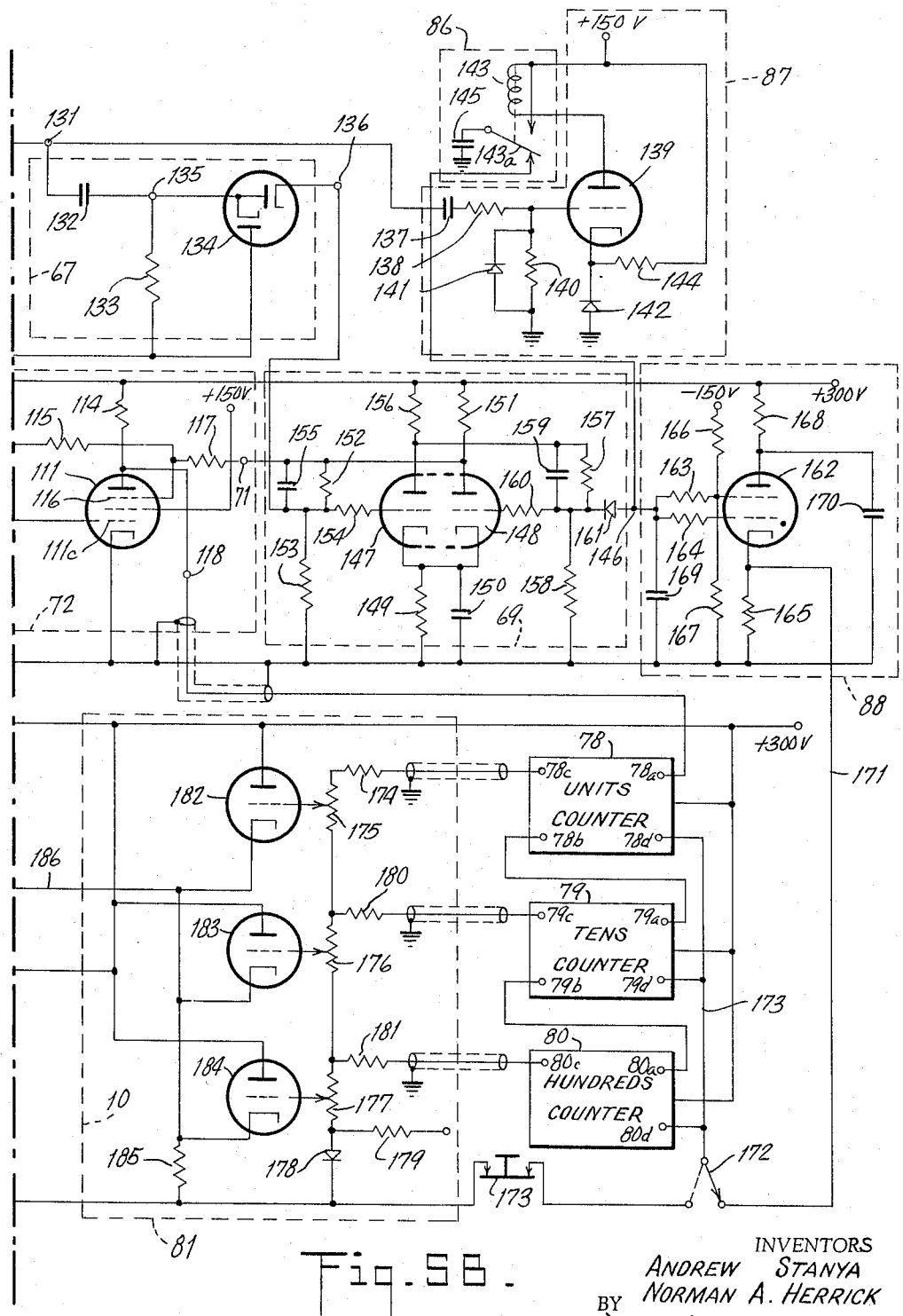

United States Patent Office 3,287,963
Patented Nov. 29, 1966

3,287,963
SONIC WAVE PULSE ECHO APPARATUS AND METHOD FOR MEASURING FLAW DIMENSION
Andrew Stanya, South Euclid, and Norman A. Herrick, Eastlake, Ohio, assignors to Republic Steel Corporation, Cleveland, Ohio, a corporation of New Jersey
Filed Apr. 8, 1963, Ser. No. 271,103
14 Claims. (Cl. 73—67.9)

This invention relates to apparatus and methods for sonic testing, typically of ultrasonic frequencies. It is shown and described herein as applied to the ultrasonic testing of a longitudinal weld in a pipe, although it is applicable to sonic testing generally. Sonic testing systems of the pulsed beam type have been employed for the purpose of locating flaws in workpieces, such as, for example, voids along a weld seam. The ultrasonic testing apparatus of the prior art is known to be highly accurate in determining the distance of the flaw from the transducer in the direction of propagation of the ultrasonic beam. However, the prior art apparatus has had relatively poor resolution in a direction transverse to the direction of propagation of the beam. Consequently, in testing a pipe for flaws in the weld, the prior art apparatus has not been able to determine accurately the length of a flaw along the weld.

An object of the present invention is to provide improved sonic testing apparatus and method having good resolution characteristics in a direction transverse to the direction of beam propagation.

Another object is to provide an improved apparatus and method of the type described including means for moving the workpiece transversely relative to the beam and counting the echo pulses received from a flaw in the workpiece.

A further object is to provide a method and apparatus of the type described, including improved means for the counting of echo pulses and thereby measuring the length of a flaw in a direction transverse to the direction of beam propagation.

Another object is to provide improved pulse counting apparatus which may be used in connection with sonic echo pulses.

The foregoing and other objects of the invention are attained in the apparatus and methods described herein. In that apparatus, a single transducer is used both as the source of the ultrasonic beam and as the detector of echo pulses. The output of the transducer is gated so that only echo pulses are transmitted from that output to a pulse counting apparatus including a digital-to-analog converter. The pulses counted by the counter are exhibited on a recorder having a chart driven in synchronism with the movement of the workpiece past the transducer and a stylus moving transversely of the direction of movement of the chart and positioned in accordance with the output of the counter.

Other objects and advantages of the invention will become apparent from a consideration of the following specification and claims, taken together with the accompanying drawings.

In the drawings:
FIG. 1 is a block diagram of an apparatus embodying the invention, together with a graphical illustration of the waveforms encountered at certain points in the block diagram;
FIG. 2 is a block diagram of an ultrasonic pulse source and oscilloscope shown as a single block in FIG. 1;
FIG. 3 is a detailed wiring diagram of a gate shown as a single block in FIG. 2;
FIG. 4 is a block diagram of the counter and digital-to-analog converter shown as a single block in FIG. 1; and FIGS. 5a and 5b, taken together, constitute a detailed wiring diagram of the apparatus shown in block form in FIG. 4.

Referring now to FIG. 1, there is shown a motor 1 driving a lead screw 2 along which moves a carriage 4 supporting a pipe 5 which moves past a transducer schematically shown at 6. The motor 1 also drives, through a reduction gear 7, a recorder chart drive mechanism 8.

The transducer 6 receives energizing pulses from an ultrasonic pulse source and oscilloscope 9 shown in detail in FIG. 2. The pulse source 9 also controls a gate 3 (FIG. 3) which limits the passage of pulses received at the transducer 6 and flowing from that transducer to a counter and digital-to-analog converter indicated generally at 10. The output of the converter is connected through an amplifier 11 to a recorder stylus drive motor 82.

The graphical line 12 shows the energizing pulses supplied to the transducer 6. It may be noted that each pulse consists of several cycles of a predetermined frequency, usually in the ultrasonic range, and interrupted or pulsed at a much lower frequency, commonly 500 times per second.

The line 13 in FIG. 1 shows the electrical wave form appearing at the output of transducer 6. This wave form includes the energizing pulses 12a from line 12, which are not blocked or filtered from the transducer output. (Commonly the same terminals are used for input and output of the transducer.) There also appear at the transducer output echo pulses 12b which may come from the side of the weld bead farthest from the transducer and echo pulses 12c, which may appear when a flaw exists between the transducer and the far side of the weld bead.

Line 14 shows a square wave signal generated internally by gate 3 in response to control signals supplied by the pulse source 9 to the control input of the gate 3. This square wave signal 14 has its pulses 14a spaced so as to exclude from the output of the gate 3 any pulses in the line 13 except those echo pulses 12c derived from the flaws in the workpiece. The line 15 shows the output of the gate 3 including only echo pulses originating with the workpiece flaws, and corresponding to the pulses 12c in line 12. The echo pulses in the line 15 are translated in the counter and converter 10 to the waveform shown in line 16 whose ordinate at any point is proportional to the count of the echo pulses since the last reset to zero. The potential represented by the line 16 is supplied from the output of converter 10 through amplifier 11 to the recorder stylus drive mechanism 82, so that the trace on the recorder chart 17 shows a series of peaks from a base line. The height of each peak shows the length of a corresponding flaw in the workpiece. The vertical scale on the chart 17 may be and preferably is substantially expanded with reference to the actual scale of the workpiece 6. In other words, six vertical inches on the chart may represent one inch on the length of the workpiece. On the other hand, the horizontal scale on the chart is compressed as compared to the scale of workpiece movement. For example, one inch in the horizontal direction on the chart may represent fifty inches of movement of the workpiece.

FIGS. 2 AND 3

The ultrasonic pulse source oscilloscope schematically shown in FIG. 2 is essentially similar to the apparatus disclosed in the application of William C. Harmon, Serial No. 764,534, filed October 1, 1958, now Patent No. 3,144,764. The pulse source includes a sine wave oscillator 18 which may operate at any one of several frequencies selected according to the maximum range of inspection pulse transit times desired in a particular application. The sinusoidal voltage generated by the oscillator 18 is applied directly to one set of deflection plates of a cathode ray tube 19, and is applied through a 90° phase shifter 20 to a set of deflection plates oriented normal to the first set of deflection plates. These two voltages, applied with equal amplitudes to the tube 19, produce a circular trace on the cathode ray tube screen as is well known.

The sinusoidal voltage developed by the oscillator 18 is also applied to a frequency divider unit 21 which generates an output voltage of approximately square wave form having a pulse period which is a multiple of the period of the oscillator 18. The output voltage of the frequency divider unit 21 is applied to an oscillator amplitude control unit 22, which generates an output current of aproximately linear sawtooth wave form during each pulse interval of the applied pulse voltage. This current is used to decrease progressively and approximately linearly with time the amplitude of the sine wave voltage generated by the oscillator 18 with the result that a spiral trace is formed on the screen of the cathode ray tube 19. At the same time, the output voltage of the frequency divider unit 21 is so applied to the intensity control electrode of the tube 19 that each pulse of the applied voltage brightens the tube trace and renders visible only the spiral trace portion of its cathode ray beam deflection. As more fully explained in the aforementioned Harmon application, manual adjustments are provided in the frequency divider unit 21 to render visible any number of complete or partial trace convolutions from a minimum of one to a maximum of six and with adjustable trace spacing or pitch.

The output voltage of the frequency divider unit 21 is also applied to a thyratron pulser 23 to develop and apply to the transducer 6 a short pulse-type train of electrical oscillations. This oscillation train is initiated simultaneously with the initiation of the visual spiral trace by the cathode ray tube 19, and the electrical oscillations have the same frequency as the natural frequency of oscillation of the transducer 6 so that the applied oscillations shock-excite the transducer at its resonant frequency. The transducer 6 may be a quartz crystal or any of various ceramic compounds, such as barium titanate, having similar operating characteristics. The transducer 6 may be selected to have any natural resonant frequency within a range thereof according to whether the type of flaw to be detected results from coarse-grain through intermediate-grain to fine-grain flaw characteristics. The transducer 6 upon being so shock-excited generates and applies to the surface of the pipe 5 or other object to be tested a brief pulse or train of high frequency ultrasonic mechanical energy. This pulse of ultrasonic energy is reflected both by the opposite surface of the weld bead on the pipe 5 and by any flaw located intermediate that surface and the transducer, and after individual transit-time intervals these ultrasonic reflections or echoes are received back and impressed upon the transducer 6 which reconverts them from mechanical energy to electrical potential oscillations. These oscillation echo pulses are applied to a broad band signal amplifier 24 having its input circuit effectively tuned to the resonant frequency of the transducer 6 and having its output circuit also tuned to the resonant frequency of the latter. The electrical oscillation echo pulses are amplified by the amplifier 24 and are applied through a coupling capacitor 25 to a radial deflection electrode of the tube 19 to display each reflected echo pulse as a radial pulse "pip" or radial deflection on the spiral trace of the tube 19.

An ultrasonic inspecting system embodying the present invention includes the gate 3 controlled by the pulse potential developed in the output circuit of the frequency divider unit 21, which is applied to the gate 3 through a coupling capacitor 27. It will be recalled that each pulse of the potential developed by the frequency divider 21 causes the thyratron pulser 23 to shock-excite the transducer 6 and generate an ultrasonic inspection pulse. Each potential pulse applied through the capacitor 27 to the gate 3 is utilized to cause the latter to generate a gate potential pulse 14a (FIG. 1). This gate potential pulse is generated in delayed relation to a corresponding input potential pulse from the unit 21, the delay being manually adjustable by adjustment of a first time constant circuit in the gate 3 as explained more fully below in connection with FIG. 3.

The gate potential pulse 14a is supplied to a resistor 28 and to a beam accelerating electrode 29 of the cathode ray tube 11 and velocity modulates the cathode ray beam. This causes each gate potential pulse to be displayed as a radial deflection or plateau on the spiral trace reproduced by the tube 19 so that the duration of the gate pulse and its delay with respect to a corresponding ultrasonic inspection pulse are visually evident with the same scaled accuracy as the display of fault echo pulses. It will be apparent that the distance of the gate plateau from the origin of the trace pattern indicates the sum of the transit times required for an inspection pulse to travel from the transducer abutting an inspection surface of the body 5 to a particular point in that body and for the resultant reflected echo pulse to return from that point to the transducer. It will also be apparent that the width of the gate plateau on the trace identifies a range of echo transit times, and thus identifies a selected region where any flaws or faults in the body 5 are of particular interest in a given application. The duration of the gate potential pulse, and the corresponding width of that selected region and hence the width of the gate plateau of the trace, may be manually adjusted to a given value corresponding to a relatively narrower or a relatively wider echo transit time range. This is accomplished by manual adjustment of a second time constant circuit in the gate 3 as will presently be explained more fully.

The echo pulses 12c developed in the output circuit of the signal amplifier 24 are applied through a junction 26a (FIGS. 2 and 3) to a voltage divider, comprised by series resistors 31 and 32 (FIG. 3), and a diode 33 to an input terminal 30 of the gate 3. Those echo pulses which are received at 26a from an amplifier 24 during the ON interval of a gate potential pulse 14a, and which exceed a preselected amplitude level, are transmitted through the gate 3 to a gate output terminal 34 connected to the input of counter 10.

The inspection apparatus and system just described is particularly suited for the production inspection of large numbers of similar pieces. For example, the gate 3 may be adjusted to provide recordings identifying weld voids in pipe seams so that as each pipe is inspected an indication of a defect of the type sought is reliably provided and lack of such indication signifies an acceptable product.

FIG. 3 shows the detailed electrical circuit arrangement of the gate 3 of FIG. 1. The system includes a first monostable multivibrator 35 of conventional cathode coupled circuit arrangement utilizing an input triode tube section 36 normally nonconductive and a pentode output tube section 37 normally fully conductive. Input pulses of positive polarity applied through the capacitor 27 from the frequency divider unit 21 as previously described are differentiated by action of the capacitor 27 and a resistor 27a and are peak-stabilized by a diode 33a and are applied to the control electrode of the triode tube section 36 to render the latter conductive on the leading edge of each input pulse. The pentode tube section 37 is thereupon rendered nonconductive in a manner well known, and remains nonconductive while a coupling capacitor 38 discharges through a fixed resistor 39 and a manually adjustable resistor 40 serially connected across the input electrodes of the pentode tube section 37. The time constant of the capacitor 38 and resistors 39, 40 establishes the previously described delay between the application of an input pulse through the capacitor 27 and the generation of a gate pulse, and in practice may have a range of manual adjustment to maintain the pentode tube section 37 nonconductive over an interval of from about 20 microseconds minimum to 220 microseconds maximum thus to provide a maximum delay equivalent to a depth of approximately three feet in a metallic body to be inspected.

During the interval of nonconductivity of the pentode tube section 37 of the multivibrator stage 35, a positive pulse potential is developed in the output circuit of the pentode tube section. This potential pulse is applied through a relatively small coupling capacitor 41 to the control electrode of a normally fully conductive pentode tube section 42 of a second monostable multivibrator stage 43 also of conventional cathode coupled type and likewise utilizing a normally nonconductive triode tube section 44. A fixed resistor 45 and manually adjustable resistor 46 are serially connected between the input electrodes of the pentode tube section 42, and the value of the coupling capacitor 41 is so selected with relation to the values of the resistors 45 and 46 as to differentiate the potential pulse developed in the output circuit of the multivibrator stage 35. Thus a relatively short duration positive potential pulse is applied to the input electrodes of the pentode tube section 42 at the initiation of the output potential pulse of the multivibrator stage 35, but this positive applied pulse has no effect since the pentode tube section 42 is normally fully conductive. However, when the potential pulse developed in the output circuit of the multivibrator stage 35 terminates, the differentiation of this pulse causes a relatively sharp negative pulse to be applied to the input electrodes of the pentode tube section 42 to render the latter nonconductive. This causes the triode tube section 44 to be rendered fully conductive. By reason of the discharge of a coupling capacitor 47 through the resistors 45 and 46, the interval of nonconductivity of the pentode tube section 42 is controlled by the time constant of the capacitor 47 and resistors 45 and 46. The component values of this time constant circuit are so selected as to maintain the pentode tube section 42 nonconductive for an interval from approximately five microseconds minimum to approximately sixty-five microseconds maximum, which corresponds to sixty-five microseconds maximum, which corresponds to a range of depths of approximately one foot in a metallic body to be inspected.

While the pentode tube section 42 is nonconductive, a positive potential pulse is developed in its anode circuit and is applied through a coupling capacitor 48 to a cathode follower stage 49 to develop across a cathode output resistor 50 the gate potential pulse earlier described and which is supplied through a shielded conductor 51 to the accelerating electrode 29 of the cathode ray tube 19 (FIG. 2) to produce the trace plateau.

The screen electrode 52 of the pentode tube section 42 of the multivibrator stage 43 develops a positive energizing potential through a resistor 53, which thus provides a second output circuit in which an even larger output pulse potential of this stage is developed. This pulse potential is applied to a control electrode 54 of a coincidence circuit 55. The echo pulse signals which are received from the signal amplifier 24 of FIG. 2 through the diode 33 are applied to a control electrode 56 of the coincidence circuit 55. The coincidence circuit 55 has its cathode 57 normally as positively biased by a potential divider, comprised by series resistors 58, 59 and 60 as shown, that the coincidence circuit 55 is normally nonconductive and does not translate the echo pulses applied to its control electrode 56 unless a gate potential pulse is simultaneously applied to its control electrode 54 from the second multivibrator stage 43. The resistor 60 is manually adjustable to effect selection of the minimum echo pulse amplitude which will render the coincidence circuit 55 conductive, thus effecting amplitude selection of echo pulses for translation to the output of the coincidence circuit.

Any echo pulses which are translated by the coincidence circuit 55 during an output gate potential pulse of the second multivibrator stage 43 are coupled through a capacitor 61 to output terminal 34 and thence to a counter and converter unit 10 shown as a single block in FIG. 1 and in greater detail in FIGS. 4 and 5.

FIG. 4

The echo pulses passed by the gate 3 to terminal 34 are transmitted through an amplifier 62 to the inputs of two monostable multivibrators shown diagrammatically in FIG. 4 at 63 and 64. The waveform appearing at the inputs of the multivibrators 63 and 64 is shown at 65 in FIG. 4, and is identical, except for differences in the scales, with the wave form shown in the line 15 of FIG. 1. The wave form at the output of the multivibrator 64 is shown by the line 66 and comprises a series of square waves whose leading edges are coincident with the leading edge of the first cycles in the pulses in line 65. The echo pulses in line 65 may vary considerably in form and duration depending upon the contour of the particular flaw being observed. The multivibrator 64 has the effect of translating each echo pulse into a square wave pulse of standardized form, as shown by line 66.

The output of multivibrator 64 is supplied to a differentiator and diode shown diagrammatically at 67, whose output consists of a series of single peak pulses, shown at 68 and coincident with the trailing edges of the square wave pulses in line 66 The output of the differentiator and diode 67 is supplied to one input of a biased bistable multivibrator 69. Any one of the pulses in line 68 is effective to switch the bistable multivibrator 69 from a first stable condition wherein its output potential is low, to a second stable condition wherein its output potential is high. The output potential of the bistable multivibrator 69 is shown in line 70. It may be noted that this potential switches from a low value to a high value at a time coincident with the first positive pulse in the line 68.

The bistable multivibrator 69 has a second input controlled by a relay 86. Energization of relay 86 is controlled by a relay driver circuit 87, whose input is in turn controlled by the signals at the output of monostable multivibrator 64. The output of the bistable multivibrator 69 is connected to one input 71 of a coincidence circuit 72. The coincidence circuit 72 has a second input 73 connected to the output of a differentiator 74, whose input is connected to the output of the monostable multivibrator 63. The monostable multivibrator 63 has a square wave output whose "on" time is substantially shorter than the "on" time of the square wave output of the multivibrator 64. The differentiator 74 converts these short square wave pulses into pairs of alternate negative and positive pulses, as shown at 75.

After the input 71 of the coincidence circuit 72 is switched to its high potential condition, then any negative pulses appearing at input 73 are passed through the coincidence circuit 72 and appear at its output, as shown at 76. The pulses at the output of the coincidence circuit 72 are supplied to a counter generally indicated at 77 and including a units counter 78; a tens counter 79 and a hundreds counter 80. Each of these counters may be pulse counters of a well known design, such as the frequency counters described in the book entitled, "Principles of Electronic Instruments," by Gordon R. Partridge, published by Prentice Hall, Inc., in 1958, on pages 171 to 180. Such counters have a pulse input terminal, indicated respectively at 78a, 79a and 80a, a pulse output terminal indicated respectively at 78b, 79b and 80b and an analog output terminal 78c, 79c and 80c, at which potentials appear corresponding to the total number of pulses received at the respective input terminals. Each counter produces a carry pulse at its pulse output terminal when the total pulses in the counter exceed the counter capacity. The counters are also supplied with reset input terminals 78d, 79d and 80d. A reset pulse may be applied to these terminals by a reset circuit 88 controlled by relay 86, and is effective to reset all the counters to zero.

The analog output terminals 78c, 79c and 80c are connected to an adder 81 effective to produce an output potential which measures the total pulses registered in all three of the counters. The output of the adder 81 is supplied to the amplifier 11, whose output is in turn transmitted to drive mechanism 82 for controlling the position of the stylus 17a of recorder 17.

The line 84 in FIG. 4 shows the variation in the output potential of the adder 81 in response to the counted pulses shown in the line 76. The line 85 in FIG. 4 represents on an enlarged scale, the trace appearing on the chart of recorder 17 in response to the potential shown in line 84. It should be observed that the scale for which line 85 is drawn is considerably shorter than the scale for which line 84 is drawn, as indicated by the different dimensions of the time $t_1$ indicated by the legends associated with those two lines.

FIGS. 5a AND 5b

These two figures taken together illustrate the counter and digital-to-analog converter shown as a single block 10 in FIG. 1, and in block diagram form in FIG. 4, together with the recorder stylus drive amplifier 11, shown as a single block in both FIG. 1 and FIG. 4. Each block in FIG. 4 has a counterpart in FIGS. 5a and 5b marked with the same reference numeral.

The amplifier and clipper circuit 62 receives a pulse echo signal at input terminal 34 and applies it to a control electrode 89 of a pentode 90, which may be a 6U8–A tube, cathode biased by a resistor 91. A resistor 92 and a diode 93 are connected in parallel between the control electrode 89 and ground. The diode 93 is poled to pass the positive components of the input signal to ground, allowing only the negative components to reach the control electrode 89. A load resistor 94 is connected between the anode of the pentode 90 and the B supply, indicated as +300 volts. The pentode 90 amplifies and inverts the signal, the inverted signal appearing at the anode. The inverted signal is coupled through a capacitor 95 to the cathode of a diode 96, which shunts to ground any negative portion of the signal from the anode of the pentode 90, so that only the positive portions of that signal appear between the cathode of diode 96 and ground. These positive portions are coupled through a capacitor 97 to the input of monostable multivibrator 63. The multivibrator 63 includes a twin triode 98, 99 which may be a 12AU7. The capacitor 97 is connected to the control electrode 98c of triode 98. A resistor 100 and a parallel Zener diode 101 are connected between the control electrode 98c and ground. The Zener diode 101 is effective to short to ground any negative components of the signal appearing at control electrode 98c, and also shorts to ground any positive signal that exceeds its Zener voltage.

The triodes 98, 99 are cathode coupled to ground through a resistor 102. The anode of triode 98 is connected through resistors 103 and 104 to the B supply. The control electrode 105 of triode 99 is connected through a resistor 106 to the B supply and through a capacitor 107 to the anode of triode 98. The anode of triode 99 is connected to the B supply through a resistor 108 and resistor 104.

In the absence of an input signal, the connection of control electrode 105 to the B supply through resistor 106 is effective to bias it positively so that triode 99 conducts heavily, producing a sufficient drop across resistor 102 so that triode 98, whose control electrode 98c is at ground potential is cut off.

A positive signal appearing at the control electrode 98c causes current to flow through triode 98 and develop a potential drop across resistor 103, lowering the potential at the anode of triode 98. This drop in potential is transmitted through capacitor 107 to the control electrode 105, causing a reduction in the current flow through triode 99 and a corresponding reduction of the potential drop across resistor 102. The reduced voltage across resistor 102 permits more current to flow through triode 98 and hence a larger drop in potential to appear at the control electrode 105. The action is cumulative and continues until triode 99 stops conducting, which occurs even though the original signal terminates. During this process, capacitor 107 gradually becomes charged. As soon as triode 99 stops conducting, capacitor 107 starts to discharge through resistors 103, 104 and 106. The triode 98 remains conducting and the triode 99 nonconducting for a period of time depending upon the time required for capacitor 107 to discharge to a point where the switching process in the multivibrator starts to reverse itself. The reversing action, like the original switching action, is cumulative and rapidly switches the multivibrator back to its original condition with the triode 99 conducting and the triode 98 cut off. This condition is described as the OFF condition of the multivibrator, whereas the condition with triode 98 conducting and triode 99 cut off is described as the ON condition. The length of time that the multivibrator remains in the ON condition after receipt of a positive input signal is determined only by the circuit constants in the network associated with capacitor 107, and not by the amplitude or other characteristics of the input signal. The input signal need only be large enough to initiate the switching of the multivibrator from its OFF to its ON condition.

Consequently, in response to each input signal, the multivibrator 63 produces a square wave output signal of predetermined width. This signal is differentiated in the differentiator 74 comprising a capacitor 109 and a resistor 110, and is transmitted to input 73 of the coincidence circuit 72. The differentiated signal appears at 73 as a series of alternating negative and positive pulses, as shown at 75 in FIG. 4.

The coincidence circuit 72 includes a pentode 111. Control electrode 111c of pentode 111 is connected through a resistor 112 to input terminal 73. A resistor 113 is connected between input terminal 73 and a potential supply indicated in the drawing as being +150 volts. The resistor 110 is connected between input terminal 73 and ground. The resistors 113 and 110 are selected to form a voltage divider that provides a potential at the control electrode 111c sufficiently negative to hold the pentode 111 cut off in the absence of a positive input signal. The anode of pentode 111 is connected through a resistor 114 to the positive terminal of the B supply. The suppressor electrode 116 is connected through a resistor 115 to the positive terminal of the 150 volt supply. Suppressor electrode 116 is also connected through a resistor 117 to input terminal 71 of the coincidence circuit 72. Output terminal 118 of coincidence circuit 72 is connected to the anode of pentode 111. The characteristics of the coincidence circuit 72 are selected so that the pentode 111 can conduct only when positive signals appear both at the suppressor electrode 116 and at the control electrode 111c. Both of those electrodes are normally biased to negative potentials. As long as either one of them remains at its biased potential, it is effective to keep the pentode 111 non-conductive. In other words, a coincidence of positive signals at the pentode 111c and 116c is required to produce an output signal at terminal 118.

The monostable multivibrator 64 includes a twin triode 120, 121. The monostable multivibrator 64 is generally similar to the monostable multivibrator 63, except that its input signal is coupled through a resistor 122 having a slidable tap connected through a resistor 123 to the control electrode 120c so as to provide an adjustable control of the magnitude of an input signal which will trip the multivibrator 64 to its ON condition. The control electrode 120c of triode 120 is coupled to ground through a diode 124. The cathodes of the triodes 120 and 121 are connected together. A resistor 125 and a diode 126 are connected in parallel between the cathodes and ground. Resistors 127 and 128 respectively connect the anodes of the two triodes 120 and 121 to the B supply. A resistor 129 connects the control electrode of triode 121 to the B supply. A capacitor 130 couples the anode of triode 120 to the control electrode of triode 121. The anode of triode 121 is connected to an output terminal 131.

The output of multivibrator 64 is supplied to the differentiator and diode circuit 67 and also to the relay driver circuit 87. The differentiator and diode circuit includes a capacitor 132 and a resistor 133 connected in series between terminal 131 and ground. A twin diode 134 has one of its anodes and the other of its cathodes connected together and to the common terminal 135 of capacitor 132 and resistor 133. The other anode of the twin diode 134 is connected to ground and is effective to bypass to ground any negative components of the signal appearing at the common junction 135. The other cathode of the twin diode 134 is connected to an output terminal 136 and thence to one of the input terminals of the bistable multivibrator 69.

The output terminal 131 of multivibrator 64 is also connected to the relay driver stage 87 through a coupling capacitor 137 and a resistor 138 and thence to the control electrode of a triode 139. A resistor 140 and a diode 141 are connected in parallel between the control electrode of triode 139 and ground. A diode 142 is connected between the cathode of triode 139 and ground. The winding 143 of relay 86 is connected between the anode of triode 139 and a positive B supply indicated as +150 volts. A resistor 144 connects the positive B supply and the cathode of triode 139. Resistor 144 and resistor 140 are effective in the absence of an input signal to hold the triode 139 in a non-conductive condition. A positive signal appearing at the control electrode of triode 139 starts the flow of current through the triode and energizes the winding of relay 143, causing it to pick up its contact 143a, thereby completing a circuit for energizing a capacitor 145 from the 150 volt B supply. The relay 143 is selected to have a drop out time longer than the time between the output pulses of the multivibrator 64, as long as those pulses recur at the pulsing frequency. In most cases, it is desirable to make the drop out time of relay 86 longer than the period of several output pulses from the multivibrator 64.

When a train of input pulses terminates for a time longer than the drop out time of relay 143, the contact 143a drops out and engages a back contact, thereby completing a circuit for the flow of the charge on capacitor 145 to a terminal 146 and thence to a second input terminal of the biased bistable multivibrator 69 and also to an input terminal of a reset circuit 88.

The bistable multivibrator 69 includes a twin triode 147, 148. The cathodes of the triodes 147 and 148 are connected together. A resistor 149 and a parallel capacitor 150 are connected between the cathodes and ground. Three resistors 151, 152 and 153 are connected in series between the B supply and ground. The common terminal of resistors 151 and 152 is connected to an anode of triode 148 and to the input terminal 71 of coincidence circuit 72. The common terminal of resistors 152 and 153 is connected through a resistor 154 to the control electrode of triode 147. A capacitor 155 is connected in parallel with resistor 152. Another set of three resistors 156, 157 and 158 provide a second voltage divider between the B supply and ground. A capacitor 159 is connected in parallel with resistor 157. The common terminal of resistors 156 and 157 is connected to the anode of triode 147. The common terminal of resistors 157 and 158 is connected through a resistor 160 to the control electrode of triode 148, and through an input coupling diode 161 to the terminal 146.

The two voltage dividers (151, 152, 153 and 156, 157, 158) are selected so that in the absence of an input signal the multivibrator 69 assumes a condition wherein the triode 147 is cut off and triode 148 is conducting. The current flow through triode 148 is effective to establish a potential drop across resistor 151 which is transmitted through input terminal 71 to the suppressor electrode 116 of pentode 111 in the coincidence circuit 72 and maintains the output of the coincidence circuit cut off. Upon receipt of an input signal from the differentiator and diode 67, the bistable circuit 69 switches to its other stable condition wherein the triode 148 is cut off and triode 147 is conducting. The current flow through resistor 151 is then cut off and the suppressor electrode 116 is swung positively to allow the pentode 111 to become conductive in response to every positive input pulse thereafter applied to control electrode 111c. The bistable circuit 69 remains in this second stable condition until such time as the relay 143 drops out and the capacitor 145 discharges through terminal 146 to apply a positive impulse to the control electrode of triode 148, thereby switching the triode 148 to its conductive condition and restoring the bistable circuit to its original stable condition.

When pulses appear at output terminal 118 of coincidence circuit 72, they are transmitted to the input terminal 78a of the units counter circuit 78, mentioned above. The carry output terminal 78b of counter 78 is connected to the input terminal 79a of tens counter 79. The carry output terminal 79b of counter 79 is connected to the input terminal 80a of hundreds counter 80.

A reset circuit 88 receives input pulses from terminal 146. The reset circuit 88 includes a thyratron 162, which may be a type 2D21 and which has two control electrodes connected through resistors 163 and 164 to the terminal 146. The cathode of thyratron 162 is connected through a resistor 165 to ground. Two resistors 166 and 167 are connected between a source of bias potential indicated as −150 volts and ground. The common junction of resistors 166 and 167 is connected to that one of the two control electrodes which is connected to resistor 163. An anode load resistor 168 is provided for thyratron 162. A capacitor 169 is connected between terminal 146 and ground. Another capacitor 170 is connected between the anode of thyratron 162 and ground. The output potential of the reset circuit 88 is taken from the cathode of thyratron 162 and is supplied through a wire 171 and a switch 172 to a wire 173 connected to reset inputs 78d, 79d and 80d of the three counters. The switch 172 may be shifted from the full line position shown in the drawing to the dotted line position. In the full line position, the reset circuit 88 controls the resetting of the counters. In the dotted line position, the reset input terminals are connected to ground through a push button switch 173, which may be momentarily opened to disconnect the reset inputs from ground. The counter circuits are so constructed that such a disconnection is effective to reset them to their zero values.

The counter 78 has an analog output terminal 78c connected through a resistor 174 to a voltage divider including three variable resistors 175, 176, 177 and a Zener diode 178. The cathode of the diode 178 is grounded. Potential from a suitable source is supplied through a resistor 179 to the anode of diode 178. The analog output terminal 79c is connected through a resistor 180 to the common junction of the variable resistors 175 and 176. The analog output terminal 80c is connected through a resistor 181 to the common junction of variable resistors 176 and 177. The movable taps on the variable resistors 175, 176 and 177 are connected to the control electrodes of triodes 182, 183 and 184 respectively. The anodes of these three triodes are all connected to the B supply. The cathodes of the three diodes 182, 183 and 184 are connected together and to ground through a load resistor 185. The voltage divider 175, 176 and 177 and the three triodes 182, 183 and 184 cooperate as an adder to produce across resistor 185 a potential drop proportional to the total amount registered in the counters 78, 79 and 80.

This output potential is taken through a wire 186 to the input of amplifier 11. The amplifier 11 includes a pentode 187 having a control electrode connected to wire 186. The anode of pentode 187 is connected to the B supply through a resistor 188. The cathode of pentode 187 is connected through two Zener diodes 189 and 190 in series to ground. The output potential from pentode 187 is taken from its anode through a resistor 191 having a movable tap connected to the control electrode of a triode 192. Triode 192 has its anode connected to the plate supply and its cathode connected through a load resistor 193 to ground. The cathode is also connected to an output terminal 194, which is in turn connected to the motor 82 driving the stylus 17a of recorder 17 (see FIG. 1) in a direction transverse to the direction of travel of the recorder chart.

OPERATION OF FIGS. 5a–5b

When the transducer 6 receives a train of echo pulses indicating the presence of a flaw in the workpiece, that train of pulses is transmitted through the gate 3 to the counter and converter 10 and thence to the amplifier 11, where it is effective to supply to the stylus drive motor 82 a potential for moving the stylus transversely of the chart. As long as the train of echo pulses continues to be received without any interruption longer than the period determined by the drop out time relay 143, the stylus continues to move transversely to the chart (at least until the capacity of the counters 78, 79 and 80 is reached). Since the chart travels longitudinally over only a small distance during a substantial travel of the workpiece relative to the transducer, the dimension of any flaw in the direction of relative travel of the workpiece and transducer is amplified on the transverse scale of the chart and indicated there with substantial accuracy. While there are minor errors involved because of the fact that the first echo pulse in a train is not counted and also because the drop-out time of the relay is made long enough to bridge an interruption of several pulses in the train of echo pulses, these minor errors are of no importance. It is required to note the dimension of the flaw with sufficient accuracy so that the weld can be reworked to eliminate the flaw. The reworked length of the weld will necessarily extend long enough to overlap substantially any distance involved in such minor errors.

The accuracy of the measurement in any given installation of the invention depends upon: (1) the distance between the transducer head and the flaw which produces the echo; (2) the nature of the material being tested; and (3) the angle of the flaw with respect to the face of the transducer head. In practice, flaws have been measured with an accuracy of location of each end of the flaw of about one-eighth inch. In other words, flaws as small as one-eighth of an inch can be automatically measured and recorded.

The apparatus ilustrated and described performs its best work for relatively short defects or flaws in the welds. For example, the best measurements are made when the length of the flaw is approximately in a range where a registration on the hundreds counter 80 is produced. Where shorter flaws are encountered, their measurements can be made more accurately by disconnecting the hundreds counter and perhaps the tens counter also, and changing the calibration of the recorder by readjustment of the slidable taps on resistors 175 and 176, as required, to amplify the transverse movement of the stylus in response to the smaller counts. If it is desired to record the lengths of flaws above the capacity of the counters, then additional ordinal stages must be provided for the counter.

The following table illustrates values for the various resistors and capacitors and type numbers for the various tubes and diodes which were used in an embodiment of the invention that was successfully constructed and operated:

*Table*

| Component | Value |
|---|---|
| Capacitor 25 | mmf 500 |
| Capacitor 27 | mmf 33 |
| Resistor 27a | 51K |
| Resistor 28 | 3.3K |
| Resistor 31 | 100K |
| Resistor 32 | 47K |
| Diodes 33, 33a | Type 1N90 |
| Tube 36, 37 | Type 6U8 |
| Capacitor 38 | mmf 62 |
| Resistor 39 | 82K |
| Resistor 40 | meg 3 |
| Capacitor 41 | mmf 5 |
| Tube 42, 44 | Type 6U8 |
| Resistor 45 | 24K |
| Resistor 46 | meg 1 |
| Capacitor 47 | mmf 62 |
| Capacitor 48 | mfd 0.068 |
| Tube 49 | Type 6U8 |
| Resistor 50 | 10K |
| Resistor 53 | 47K |
| Resistor 58 | 200K |
| Resistor 59 | 15K |
| Resistor 60 | 10K |
| Capacitor 61 | mmf 40 |
| Resistor 91 | ohms 300 |
| Resistor 92 | 33K |
| Diode 93 | Type 1N645 |
| Resistor 94 | 10K |
| Capacitor 95 | mfd 0.05 |
| Diode 96 | ½ 6AL5 |
| Capacitor 97 | mmf 250 |
| Tube 98, 99 | 12AU7 |
| Resistor 100 | 100K |
| Diode 101 | 1N753 |
| Resistor 102 | 4.7K |
| Resistor 103 | 47K |
| Resistor 104 | 15K |
| Resistor 106 | meg 1 |
| Resistor 108 | 47K |
| Capacitor 109 | mmf 100 |
| Resistor 110 | 20K |
| Resistor 112 | 100K |
| Resistor 113 | 220K |
| Resistor 114 | 51K |
| Resistor 117 | 470K |
| Tube 120, 121 | 12AT7 |
| Resistor 122 | meg 0.5 |
| Resistor 123 | 220K |
| Diode 124 | 1N645 |
| Resistor 125 | 2K |
| Diode 126 | 1N756 |
| Resistor 127, 128 | 47K |
| Resistor 129 | meg 10 |
| Capacitor 130 | mfd 0.1 |
| Capacitor 132 | mmf 470 |
| Resistor 133 | 33K |
| Twin diode 134 | 6AL5 |
| Capacitor 137 | mfd 0.25 |
| Resistor 138 | 100K |
| Tube 139 | 6C4 |
| Resistor 140 | 470K |
| Diode 141 | 1N645 |
| Diode 142 | 1N759 |

| | |
|---|---|
| Resistor 144 | 100K |
| Capacitor 145 | mfd 0.05 |
| Tube 147, 148 | 12AT7 |
| Resistor 149 | 15K |
| Capacitor 150 | mfd 0.005 |
| Resistor 151 | 47K |
| Resistor 152 | 390K |
| Resistor 153 | 200K |
| Resistor 154 | ohm 100 |
| Capacitor 155 | mmf 100 |
| Resistor 156 | 47K |
| Resistor 157 | 390K |
| Resistor 158 | 200K |
| Capacitor 159 | mmf 100 |
| Resistor 160 | 100K |
| Diode 161 | 1N645 |
| Tube 162 | 2D21 |
| Resistor 163 | 68K |
| Resistor 164 | 6.8K |
| Resistor 165 | ohm 270 |
| Resistor 166 | 330K |
| Resistor 167 | 6.8K |
| Resistor 168 | 330K |
| Capacitor 169 | mfd 0.02 |
| Capacitor 170 | mfd 0.01 |
| Resistor 174 | meg 8.2 |
| Resistor 175 | 10K |
| Resistor 176 | 100K |
| Resistor 177 | meg 1 |
| Diode 178 | 1N751 |
| Resistor 179 | 75K |
| Resistor 180 | meg 8.2 |
| Resistor 181 | meg 8.2 |
| Tubes 182, 183, 184 | ½ 12AU7 |
| Resistor 185 | 1K |
| Tube 187 | 5879 |
| Resistor 188 | 30K |
| Diodes 189, 190 | 1N756 |
| Resistor 191 | meg 1 |
| Tube 192 | ½ 12AU7 |
| Resistor 193 | 20K |

While we have shown and described a preferred embodiment of our invention, other modifications thereof will occur to those skilled in the art, and we therefore intend our invention to be limited only by the appended claims.

What is claimed is:

1. Sonic testing apparatus, comprising:
   (a) means for propagating through a workpiece a beam of sonic waves pulsed at a predetermined frequency;
   (b) means for relatively moving the workpiece and the beam propagating means at a predetermined speed in a direction transverse to the direction of beam propagation; and
   (c) means for detecting echo pulses from flaws in the workpiece;
   (d) means for counting the detected echo pulses.

2. Sonic testing apparatus as defined in claim 1, including means to exhibit the count determined by the counting means, and thereby to exhibit the dimension of each flaw in the direction of said relative movement.

3. Sonic testing apparatus as defined in claim 2, including digital-to-analog converter means for translating the counted echo pulses into an electrical potential.

4. Sonic testing apparatus as defined in claim 3, in which said converter means comprises:
   (a) a plurality of counter stages, one for each of a plurality of numerical orders, each counter stage comprising:
      (1) an input for receiving a train of pulses;
      (2) an analog output for supplying a potential varying in accordance with the number of pulses received;
      (3) a pulse output for supplying a pulse each time the number of pulses equals the number of digits in the numerical order;
      (4) means for resetting the analog output to zero each time a pulse is produced at the pulse output;
   (b) means connecting the pulse output of each stage to the input of the stage of next higher order; and
   (c) adder means connected to the analog outputs of all the stages for producing a potential varying with the sum of the potentials at said analog outputs.

5. Sonic testing apparatus as defined in claim 3, including potential responsive means to exhibit the count of detected echo pulses.

6. Sonic testing apparatus as defined in claim 1, including means responsive to a predetermined hiatus in the train of pulses to reset the pulse counting means.

7. Sonic testing apparatus as defined in claim 6, in which said hiatus is longer than one pulse period.

8. Sonic testing apparatus as defined in claim 1, in which said sonic waves have a frequency substantially higher than the pulse frequency, and said pulse counting means comprises:
   (a) a monostable multivibrator having an input connected to receive said echo pulses and effective in response to the leading edge of a pulse to switch from its stable state to its unstable state and to remain in the unstable state for a time longer than the pulse duration;
   (b) means to differentiate the output of the monostable multivibrator; and
   (c) means to count the output pulses of the differentiating means.

9. Sonic testing apparatus as defined in claim 1, including:
   (a) a coincidence circuit having first and second inputs and an output and operable to transmit a pulse from the first input to the output only when the second input is at the first of first and second separated potentials;
   (b) first translating means operatively connecting the output of the echo pulse detecting means to the first input of the coincidence circuit;
   (c) a bistable circuit having first and second inputs and an output and effective in response to pulses at the respective inputs to switch the output to the corresponding first or second of said separated potentials;
   (d) second translating means operatively connecting the output of the echo pulse detecting means to the first input of the bistable circuit; and
   (e) means operatively connected to the output of the echo pulse detecting means and responsive to a hiatus between echo pulses substantially greater than a period of said predetermined frequency to supply a tripping pulse to the second input of the bistable circuit.

10. Sonic testing apparatus as defined in claim 9, in which:
   (a) said first translating means comprising:
      (1) a first monostable multivibrator having an ON time substantialy shorter than one period of said predetermined frequency;
      (2) means connecting the output of the echo pulse detecting means to the input of the first monostable multivibrator; and
      (3) a first differentiataing circuit connecting the output of the monostable multivibrator to the first input of the coincidence circuit;
   (b) said second translating means comprising:
      (1) a second monostable multivibrator having an ON time substantially longer than one period of said predetermined frequency;
      (2) means connecting the output of the echo pulse detecting means to the input of the second monostable multivibrator; and (3) a second differentiating circuit connecting the output of the second monostable multivibrator to the first input of the bistable circuit.

11. Sonic testing apparatus as defined in claim 9, in which said hiatus responsive means includes:
    (a) a relay having a predetermined dropout time substantially longer than one cycle of said frequency;
    (b) means for energizing the relay in response to each echo pulse; and
    (c) a circuit controlled by a back contact of the relay for supplying a pulse to the second input of the bistable circuit upon deenergization of the relay.

12. Sonic testing apparatus as defined in claim 11, including means controlled by a back contact of the relay for resetting the counter means.

13. Sonic testing apparatus as defined in claim 6, in which said means for controlling the transverse movement of the stylus includes:
    (a) counter means having an input and an output and responsive to a train of input pulses to produce an output potential varying in accordance with the number of pulses in the train;
    (b) means for transmitting pulses from the echo pulse detecting means to the input of the counter means;
    (c) means effective in response to a predetermined hiatus in the train of echo pulses to reset the counter means to zero; and
    (d) potential responsive means operatively connected to the output of the counter means and to the stylus to move the stylus from a datum position in a direction transverse to the direction of record chart movement through a distance varying in accordance with the counter output potential.

14. The method of sonic testing, comprising the steps of:
    (a) propagating through a workpiece a beam of sonic waves pulsed at a predetermined frequency;
    (b) creating a transverse relative movement of the workpiece and the beam at a predetermined speed; and
    (c) counting echo pulses created when the beam encounters a flaw in the workpiece to determine the dimension of the flaw in the direction of the relative movement.

References Cited by the Examiner

UNITED STATES PATENTS

| | | | |
|---|---|---|---|
| 2,740,289 | 4/1956 | Van Valkenburgh et al. | 73—67.9 |
| 2,932,017 | 4/1960 | Prince | 340—347 |
| 2,969,671 | 1/1961 | Sproule | 73—67.9 |
| 2,970,306 | 1/1961 | Zieman et al. | 340—347 |
| 3,146,350 | 8/1964 | Topfer. | |
| 3,169,393 | 2/1965 | Stebbins | 73—67.9 |
| 3,213,677 | 10/1965 | Maklary | 73—67.9 |

RICHARD C. QUEISSER, *Primary Examiner.*

JOHN P. BEAUCHAMP, *Examiner.*